(12) United States Patent
Lofton et al.

(10) Patent No.: US 8,782,910 B1
(45) Date of Patent: Jul. 22, 2014

(54) MOTION-RESTRAINT TETHER FOR SAFELY STARTING GASOLINE-POWERED CHAINSAWS AND THE LIKE

(71) Applicants: Wayne E. Lofton, Dallas, OR (US); Linda C. Lofton, Dallas, OR (US)

(72) Inventors: Wayne E. Lofton, Dallas, OR (US); Linda C. Lofton, Dallas, OR (US)

( * ) Notice: Subject to any disclaimer, the term of this patent is extended or adjusted under 35 U.S.C. 154(b) by 0 days.

(21) Appl. No.: 14/027,000

(22) Filed: Sep. 13, 2013

(51) Int. Cl.
*B26B 29/06* (2006.01)
*B23D 59/00* (2006.01)

(52) U.S. Cl.
CPC ....................... *B23D 59/00* (2013.01)
USPC ............. 30/297; 30/269.1; 30/298.4; 30/514; 224/269; 24/3.1; 24/3.13

(58) Field of Classification Search
USPC ........ 30/296.1, 297, 514, 298.4; 29/428, 433, 29/434, 525.01; 224/269, 271, 221; 24/3.1, 3.12, 3.13
See application file for complete search history.

(56) References Cited

U.S. PATENT DOCUMENTS

| | | | | |
|---|---|---|---|---|
| 203,315 | A * | 5/1878 | Bickel .............................. | 30/297 |
| 2,075,779 | A * | 3/1937 | Johnson et al. .................. | 30/297 |
| 2,670,474 | A * | 3/1954 | Schultz .............................. | 2/312 |
| 4,728,123 | A * | 3/1988 | Kassal et al. .................... | 280/822 |
| 5,082,156 | A * | 1/1992 | Braun ............................ | 224/220 |
| 5,130,899 | A * | 7/1992 | Larkin et al. .................... | 362/570 |
| 5,295,620 | A * | 3/1994 | Cousineau et al. ............. | 227/156 |
| 5,349,753 | A * | 9/1994 | Gaffney ............................ | 30/155 |
| 6,254,050 | B1 * | 7/2001 | Albrecht et al. .............. | 248/303 |
| 6,315,179 | B1 * | 11/2001 | Hillis ............................ | 224/268 |
| 7,062,857 | B1 * | 6/2006 | Nenadic ............................ | 30/161 |
| 7,093,366 | B2 * | 8/2006 | Black ............................ | 30/296.1 |
| D537,708 | S * | 3/2007 | Leung ............................ | D8/395 |
| 7,284,333 | B2 * | 10/2007 | Lawler ............................ | 30/382 |
| 7,395,984 | B2 * | 7/2008 | Szarkowski et al. .......... | 242/384 |
| 7,703,211 | B1 * | 4/2010 | Kirchhoff ..................... | 30/296.1 |
| 7,958,640 | B1 * | 6/2011 | Mandriota ...................... | 30/144 |
| 8,307,865 | B1 * | 11/2012 | Cuffel .......................... | 144/24.1 |
| 2003/0102342 | A1 * | 6/2003 | Fogg ............................. | 224/269 |
| 2004/0128839 | A1 * | 7/2004 | Shaffer et al. ................. | 30/276 |
| 2004/0255471 | A1 * | 12/2004 | Black ........................... | 30/296.1 |
| 2005/0077329 | A1 * | 4/2005 | Sconzo ......................... | 224/153 |
| 2005/0258203 | A1 * | 11/2005 | Weaver ......................... | 224/162 |
| 2006/0163412 | A1 * | 7/2006 | Szarkowski et al. .......... | 242/384 |
| 2007/0145087 | A1 * | 6/2007 | Mikesell et al. ............... | 224/269 |
| 2007/0170130 | A1 * | 7/2007 | Plzak ........................... | 211/70.6 |
| 2008/0127461 | A1 * | 6/2008 | Linden et al. ................... | 24/302 |

(Continued)

FOREIGN PATENT DOCUMENTS

| | | | | | |
|---|---|---|---|---|---|
| AU | 2004226989 | A1 * | 5/2005 | ............... | A45F 3/14 |
| GB | 2353752 | A * | 3/2001 | ............... | B25G 1/02 |

*Primary Examiner* — Essama Omgba
(74) *Attorney, Agent, or Firm* — Patent Ingenius LLC; Scott Evan Gilbert

(57) ABSTRACT

An inventive device to aid mobility-limited users of gasoline-powered handheld tools while crank-starting of same is disclosed. In particular, the invention is a tethering device to prevent a tool such as a chainsaw from jumping or kicking back when crank-started by an operator with limited bodily mobility, particularly of the back, preventing placing of the tool on the ground for crank-starting. The inventive tethering device allows the operator to remain upright while safely cranking the on-board engine. The inventive device comprises an elongated tether member having first and second ends, a foot placement member for placement of the operator's foot to secure the device and restrain its movement, affixed to the first end and an attachment means for attaching the tether to a chainsaw, affixed to the second end of the elongated tether member.

15 Claims, 5 Drawing Sheets

(56) References Cited

U.S. PATENT DOCUMENTS

| | | | |
|---|---|---|---|
| 2008/0163464 A1* | 7/2008 | Baumann | 24/3.12 |
| 2009/0276979 A1* | 11/2009 | Kauffman et al. | 24/3.13 |
| 2010/0147912 A1* | 6/2010 | Salentine | 224/254 |
| 2011/0203122 A1* | 8/2011 | Holcomb | 30/382 |
| 2011/0203123 A1* | 8/2011 | Holcomb | 30/382 |
| 2011/0215127 A1* | 9/2011 | Lee | 224/580 |

* cited by examiner

MOTION-RESTRAINT TETHER FOR SAFELY STARTING GASOLINE-POWERED CHAINSAWS AND THE LIKE

FIELD OF THE INVENTION

This invention relates to devices to aid in crank-starting of gasoline-powered handheld sawing tools, such as chainsaws in particular, and prevention of injuries due to crank starting of same for operators having limited bodily mobility.

BACKGROUND

Chainsaws are considered among the most dangerous of all handheld sawing tools. Statistics have shown that over 40,000 chainsaw-related injuries occur each year, many to the upper body parts of the operator due to kickback of the tool, kickback being defined as uncontrolled sudden upward motion of the chainsaw during operation. Many injuries have occurred while starting the chainsaw, which is done by use of a recoil starter rope that is rapidly pulled by the operator one or more times, where the chainsaw may suddenly jump when the on-board gasoline-powered engine starts, and can kick back to injure the operator in the arm, hand or on the body.

To help avoid such injuries, some modern chainsaws have a footplate integral with the rear handle, for the operator to secure the chainsaw on the ground by placing a foot on the footplate while holding the front handle when starting the tool. This practice allows for safer chainsaw operation by allowing the operator to securely hold the chainsaw against the ground with a foot to help restrain the chainsaw from moving during startup, using the operator's body weight, in addition to the use of larger and stronger muscles of the leg to aid the operator's arm in securely restraining and controlling unwanted motion of the chainsaw while starting it.

The provision of footplates or other placements for the operator's foot that are integral with the body of chainsaws requires the operator to bend the back forward in order to reach the recoil starter handle for starting the on-board gasoline-powered engine. In many situations, bending the back may be painful or impossible for the operator due to back or leg injury, surgery, sciatica and other back nerve issues, bulging disks, arthritis, muscular stiffness and other conditions causing the operator to suffer from limited mobility of the back. The operator may need to kneel instead, placing a knee on the footplate of the chainsaw handle to help stabilize it. In this position, the advantage of the footplate is compromised, since the force on the footplate is now substantially reduced. There are no practical alternatives in the form of devices or chainsaw accessories offered by the marketplace to alleviate the plight of many users of chainsaws with limited mobility of the back. In many cases, the user with limited back mobility finds it impossible to start the chainsaw without help from another.

SUMMARY

The present invention provides relief for gasoline-powered handheld sawing tool users afflicted with limited back mobility. Specifically, the present invention provides a means for allowing an operator with limited back mobility and who may have difficulty or may not be able to bend his or her back to remain substantially upright while safely starting the sawing tool that has an on-board internal combustion engine. While the invention is generally directed to gasoline-powered handheld sawing tools that have a sawing or cutting function with an exposed elongated cutting bar and teeth for sawing, the invention is especially directed to gasoline-powered chainsaws, as such tools are the most dangerous of this category as the exposed cutting teeth are disposed on a moving chain running rapidly along the vertically-oriented edges of a cutting chain guide bar extending forward of the on-board engine. Thus the exposed cutting teeth of the chainsaw pose a great danger to the operator if kickback occurs, kickback being defined as an uncontrolled sudden vertical motion of the cutting bar and sawing chain of the chainsaw towards the operator's head, shoulder, arm or upper body. The gasoline-powered chainsaw will henceforth be used to represent the category of gasoline-powered handheld sawing tools in this disclosure. Another appropriate tool in this class to which the present invention may be directed would be the gasoline-powered hedge trimmer. However, the cutting teeth of this type of tool are oriented horizontally along a reciprocating bar extending forward of the on-board engine, and therefore pose less of an injury risk to the operator by sudden and uncontrolled vertical motion, particularly when starting the on-board gasoline engine. Nevertheless, the hedge trimmer may also cause injury due to kickback on starting if the tool is not constrained vertically. Normal procedure for crank-starting these tools is to hold the tool firmly on the ground by grasping the front handle and pressing on a foot plate or shelf on the rear handle with the operator's foot to constrain the tool from moving, when crank-starting the on-board gasoline engine. Alternatively, the operator may place the chainsaw on the ground and kneel next to it, pressing down on the front handle of the chainsaw with one hand while crank-starting the tool with the other. All the while the operator must bend the back or kneel down, which may also involve engaging the back, to start the chainsaw. For those with painful lower backs or in general have limited mobility in the back but may otherwise work safely while remaining upright, starting the chainsaw by oneself may be very difficult if not impossible. The instant invention provides a way for such operators to work safely independently by providing a means for safely starting any gasoline-powered chainsaw or other gasoline-powered handheld sawing tool having an elongated and exposed cutting bar and saw teeth while remaining upright and stabilized (not bending the lower back), by allowing the operator to hold the chainsaw above the ground at a comfortable height by gripping the front handle with one arm, starting the chainsaw with the other arm, and simultaneously using the operator's body weight to restrain sudden vertical movement of the chainsaw by engaging one of the operator's feet in a foot placement member of the invention while starting the tool.

The present invention comprises an elongated tether member having a first end and a second end, a foot placement member wherein the first end of the tether member is affixed to the foot placement member, which itself may comprise a loop, ring, stirrup, foot plate or other means for engaging one of the user's feet; the second end of the tether member is affixed to the attachment means member the serves to attach the tether member to an attachment point on the chainsaw, for example, the front handle of the chainsaw. The attachment means member may comprise a hook means for engaging a handle of the chainsaw, or may comprise a strap and buckle means or self-closing strap (comprising hook-and-loop fabric, such as Velcro) for tying around a handle or other attachment point of a chainsaw.

Alternatively, the attachment means may comprise a strap and a first member of a quick release buckle or clip means to engage a second member of the quick release buckle or clip means affixed to the chainsaw and extending therefrom. The tether member may comprise a flexible band, such as a fabric strap means, a rope means, a chain means, a wire cable means, or a rigid structure, such as an extendable telescoping pole means. The chainsaw operator secures the attachment means to, as an example, one of the chainsaw handles, or to the body of the chainsaw motor housing, while placing one foot in the foot engaging means affixed to the first end of the flexible band. The foot engaging means, such as a stirrup, preferably may be held against the ground by the operator's foot, but may be also held against the flat surface of a tree stump or other convenient surface or structure, while the operator holds the chainsaw at a comfortable and safe level for startup of the chainsaw engine.

The chainsaw operator thus remains in an upright but stable position, safely pointing the front of the chainsaw away from the body while starting the chainsaw engine by pulling briskly on the recoil starter rope handle, one or more times to crank-start the on-board engine. As with chainsaws equipped with an integral footplate provided for the operator to hold the chainsaw against the ground his or her foot to stabilize the chainsaw during startup, with the instant invention the operator may also advantageously use his or her body weight to restrain the chainsaw from sudden unwanted motion, such as jumping or kickback in response to the sudden starting of the engine, however while remaining in a substantially upright position as opposed to bending over whereby the lower back must be bent or strained.

DETAILED DESCRIPTION

Figures 1A, 1B:
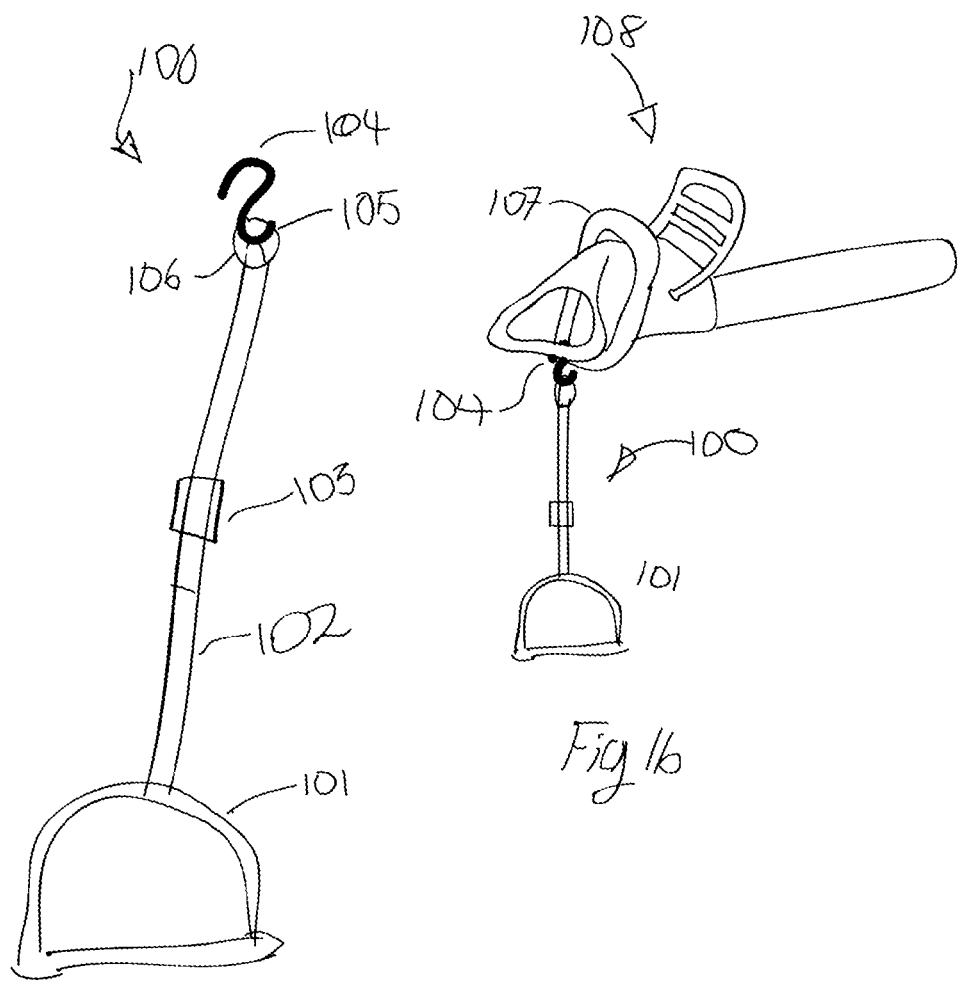
FIG. 1a. Depiction of the preferred embodiment of the inventive restraint tether.
FIG. 1b. Depiction of the preferred embodiment in deployment with a chainsaw.

FIG. 1a shows one aspect of the preferred embodiment of the inventive chainsaw cranking restraint tether 100. In the preferred embodiment, a foot-engaging member, such as foot stirrup 101 shown in the figure, is affixed to the proximal end of flexible elongated tether member 102 capable of having an adjustable length. Preferably, the elongated tether member may be a flexible strap fabricated from a strong natural or synthetic fabric, or blended fabric weave. Alternatively, the strap may be made from leather, plastic, metal chain or a metallic weave. It is an important aspect of the invention that the tether member has an adjustable length. Adjustment of the tether can be accomplished by, but by no means limited to, cinch buckle means 103. In the preferred embodiment, the operator may adjust the length of the tether by use of the cinch buckle so that the chainsaw is held at a height that is comfortable and safe for the operator to safely hold and crank-start the chainsaw.

Referring again to FIG. 1a, an attachment means 104 for securing tether member 102 to the chainsaw is shown affixed to tether 102 at the end distal to foot stirrup 101. A hook may be used for this purpose, as shown in FIG. 1a. The operator may quickly attach engage one of the chainsaw handles by affixing hook means 104 around the handle. Hook means 104 may form an outer portion of an S-shaped hook, whereby an inner hook portion 105 of the S-shaped hook may be inserted into a ring 106 that is affixed to the distal end of the tether, by passing through a hole or loop disposed on the distal end of tether member 102. The inner hook portion 105 of the S-shaped hook can be permanently secured to the tether by being sewn into the fabric or material of the tether.

The embodiment described above is preferred for ease of storage and transporting of the invention. Being compact and lightweight, the invention can be easily carried into wilderness or other remote locations by the operator. This is particularly advantageous in a wilderness setting, where compact and lightweight tools and accessories that must be carried by personnel are highly valued. The invention may thus be carried in a backpack or on a tool belt, aiding most loggers and tree trimmers, who may unpack and deploy the invention when needed, but may also be of great aid to property owners and the like for tree felling and trimming, and for cutting firewood. A typical deployment of the preferred embodiment of the invention is shown in FIG. 1b, wherein the inventive chainsaw restraint tether is depicted secured to front handle 107 of chainsaw 108.

Figure 1C:
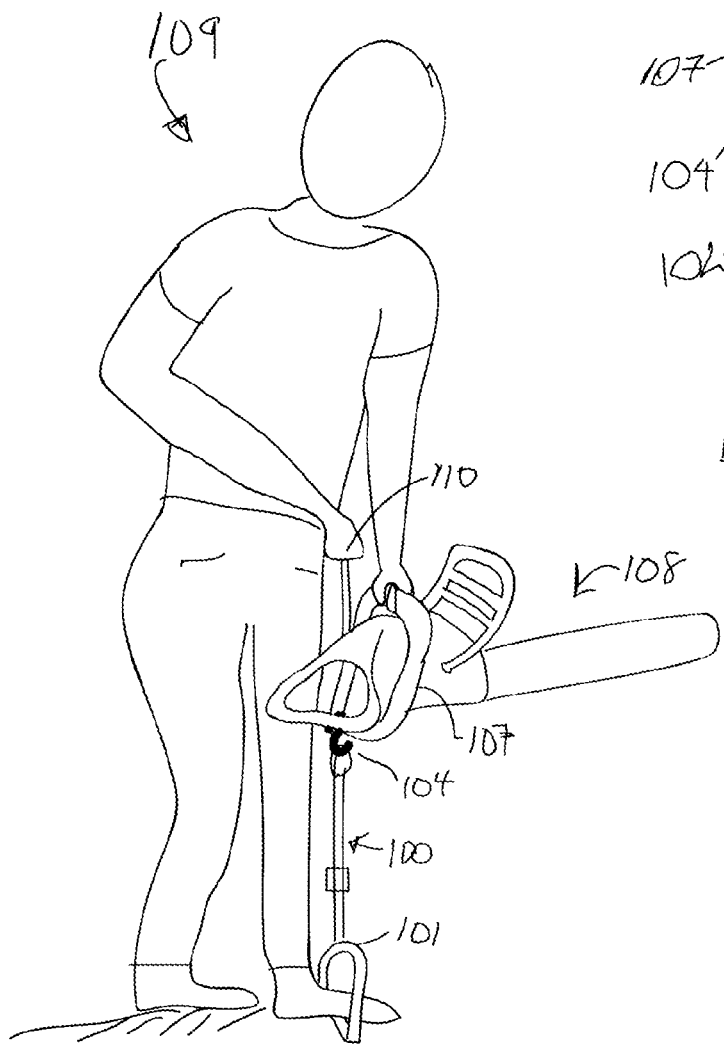
FIG. 1c. Depiction of a typical deployment of the preferred embodiment in use by a chainsaw operator.
Figure 1D:
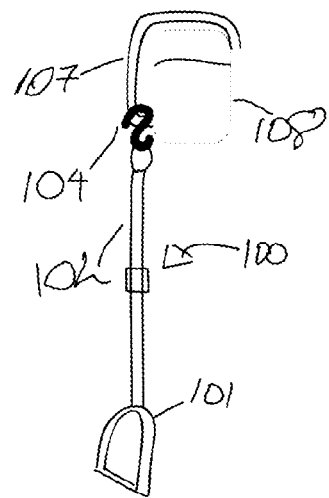
FIG. 1d. View from rear of chainsaw detailing the attachment of the preferred embodiment of the inventive restraining tether to the bottom portion of the front handle of the chainsaw, which is typically on the left side of the chainsaw.

FIG. 1c further depicts a typical deployment of preferred embodiment of the invention 100, whereby right-handed chainsaw operator 109 has attached the invention in its preferred embodiment to chainsaw 108 via hook means 104, holding front handle 107 of chainsaw 108 with the left hand, and recoil starter rope handle 110 with the right hand. The operator's left foot is placed in the foot stirrup 101, wherein the operator 109 is placing his or her body weight on the left foot to hold stirrup 101 to the ground, preventing chainsaw 108 from unwanted sudden and potentially dangerous movement, such as kickback when the engine starts up. FIG. 1d shows a rear view of chainsaw 108, showing a the preferred deployment of the invention 100, where hook means 104 attaches tether 102 to the bottom portion of the front handle 107 of chainsaw 108.

While not as compact as the foot stirrup of the preferred embodiment (101 in FIGS. 1 a-c), foot pocket 201 may provide a more stable foot placement means as more surface area from the operator's foot is in contact with the structure, increasing the amount of friction to prevent the foot placement from possible sliding, increasing control of chainsaw 207. Foot pocket 201 may have a flat bottom portion upon which the operator's foot rests. As a further alternative embodiment of the foot engagement member, a foot pedal (not shown) may be used.

As a further aspect of this embodiment, a quick-release buckle or clip system having two mating members (202 and 203) (also known as backpack clips) may be used to attach the tether to chainsaw 207 in a manner similar to that described above, whereby short tether strap 204 is attached to front handle 208 of chainsaw 207. By way of example, one mating member 202 of the clip system may be affixed to a first end of short tether strap 204, the second end of the short tether strap 204 being affixed preferably to chainsaw handle 208 or other suitable anchor point on the chainsaw. The second mating member 203 of the quick-release buckle or clip system may be then affixed to the distal end of the longer tether strap 205 having the proximal end affixed to foot pocket 201.

Cinch buckle 206 may be used for adjustment of the length of the longer tether strap 205 as described above. Short tether strap 204 may be preferably attached to front handle 208 of the chainsaw by wrapping the end portion of strap 204 around the handle and securing it using a fastening means, preferably a hook-and-loop fabric fastener (Velcro). However, other means of fastening are possible, such as a hook means 209, or tying short tether strap 204 to one of the chainsaw handles by means of an appropriate knot.

Figure 2:
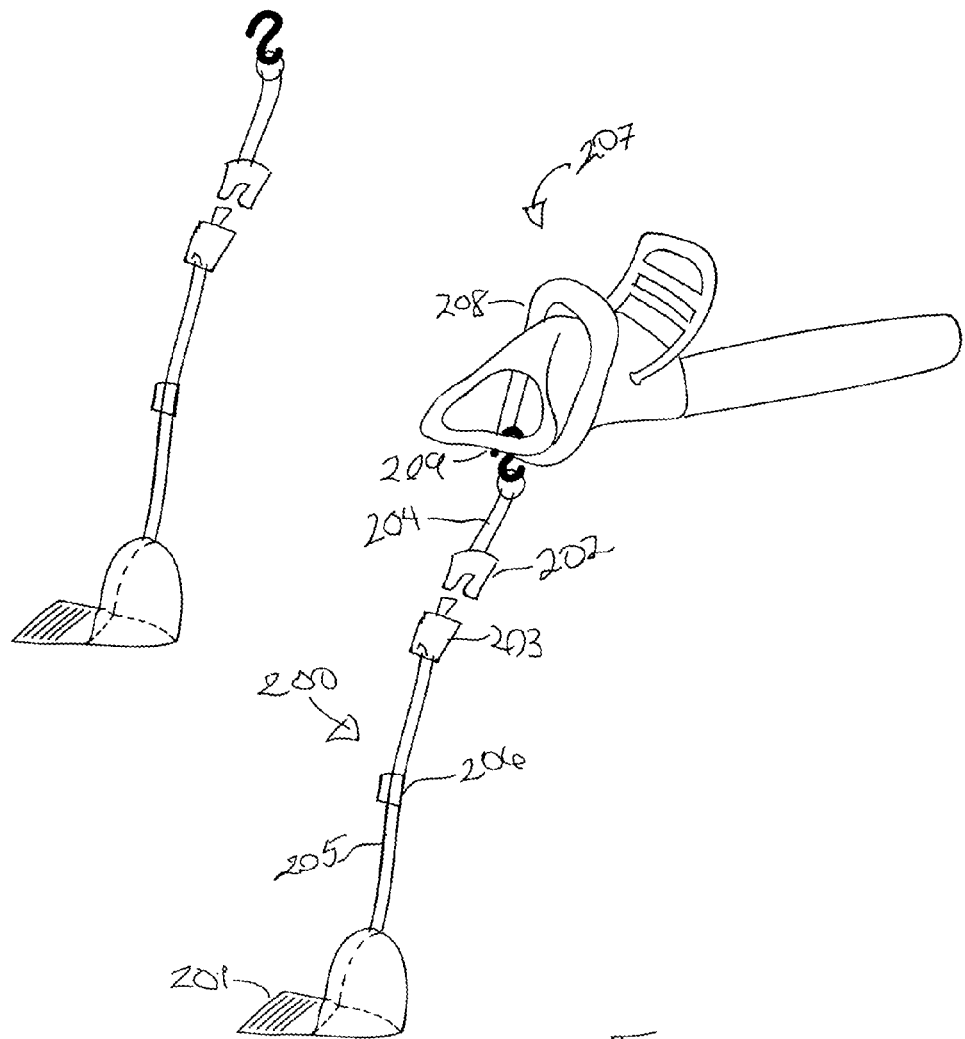
FIG. 2. Depiction of an alternative embodiment of the inventive restraint tether device, shown in deployment with a chainsaw.
Figure 3:
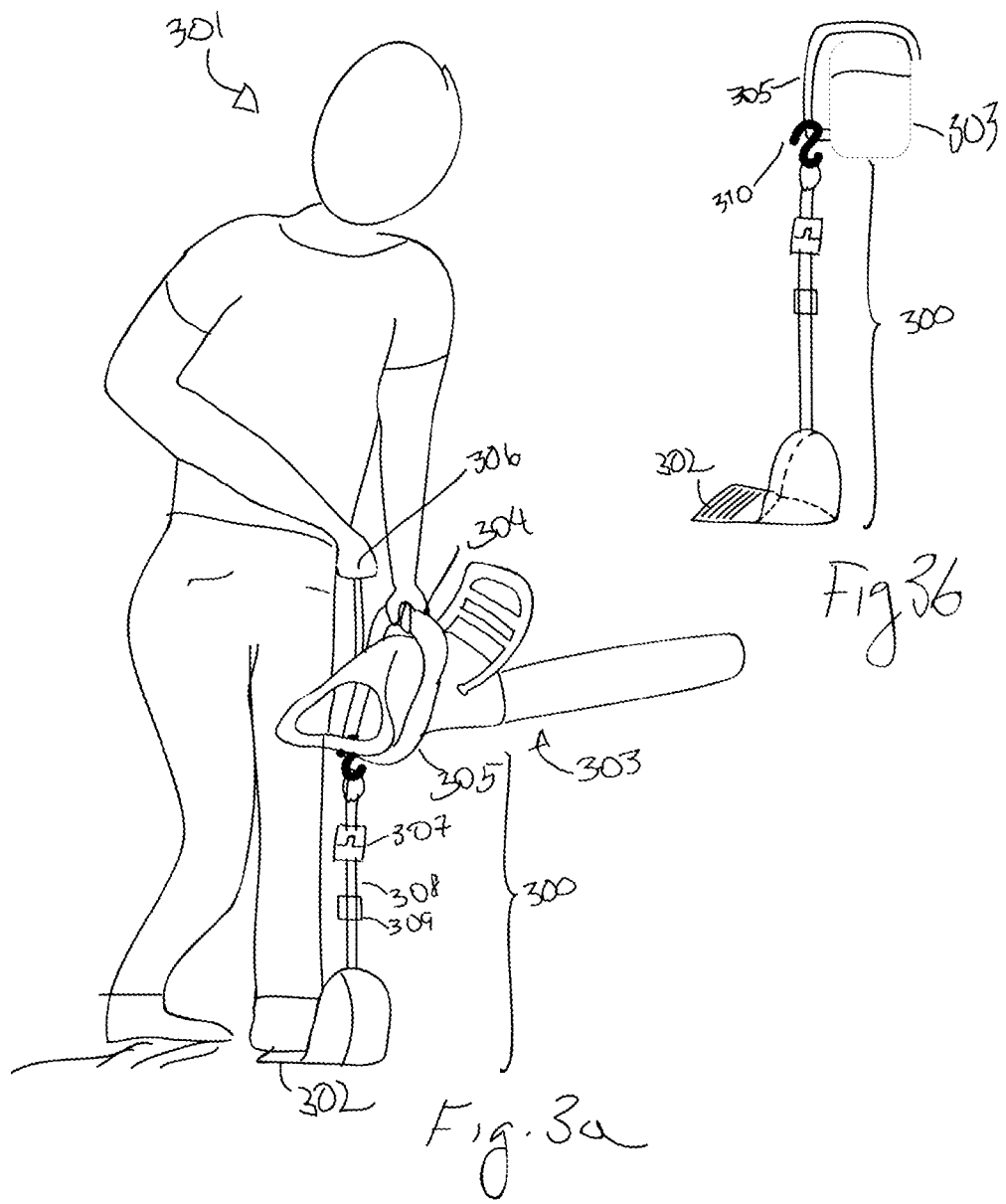
FIG. 3a. Depiction of a typical deployment of the alternative embodiment shown in FIG. 2 in use by a chainsaw operator.
FIG. 3b. View from rear of chainsaw detailing the attachment of the alternate embodiment of the inventive restraining tether to the bottom portion of the front handle of the chainsaw, which is typically on the left side of the chainsaw.

Referring now to FIG. 3a, a typical deployment example for the embodiment of the invention 300 as described above and depicted in FIG. 2 is shown. In a manner similar to the deployment of the preferred embodiment described previously, operator 301 steps on foot pocket 302 with his or her left foot, pressing body weight onto foot pocket 302 that is placed on the ground. Operator 301 firmly grasps chainsaw 303 by top portion 304 of front handle 305 with the left hand, and cranks the recoil starter by pulling on handle 306 with the right hand. The two mating members of quick release buckle 307 are engaged to form a contiguous connection between chainsaw 303 and foot pocket 302. The length of strap 308 is adjusted using cinch buckle 309 to a length such that chainsaw 303 is at a comfortable and safe height for operator 301 to safely start the engine, preferably between the operator's waist and knee. FIG. 3b shows the detail of the attachment of the invention 300 to chainsaw 303 using hook means 310 to hook over the bottom portion of front handle 305.

Figure 4:
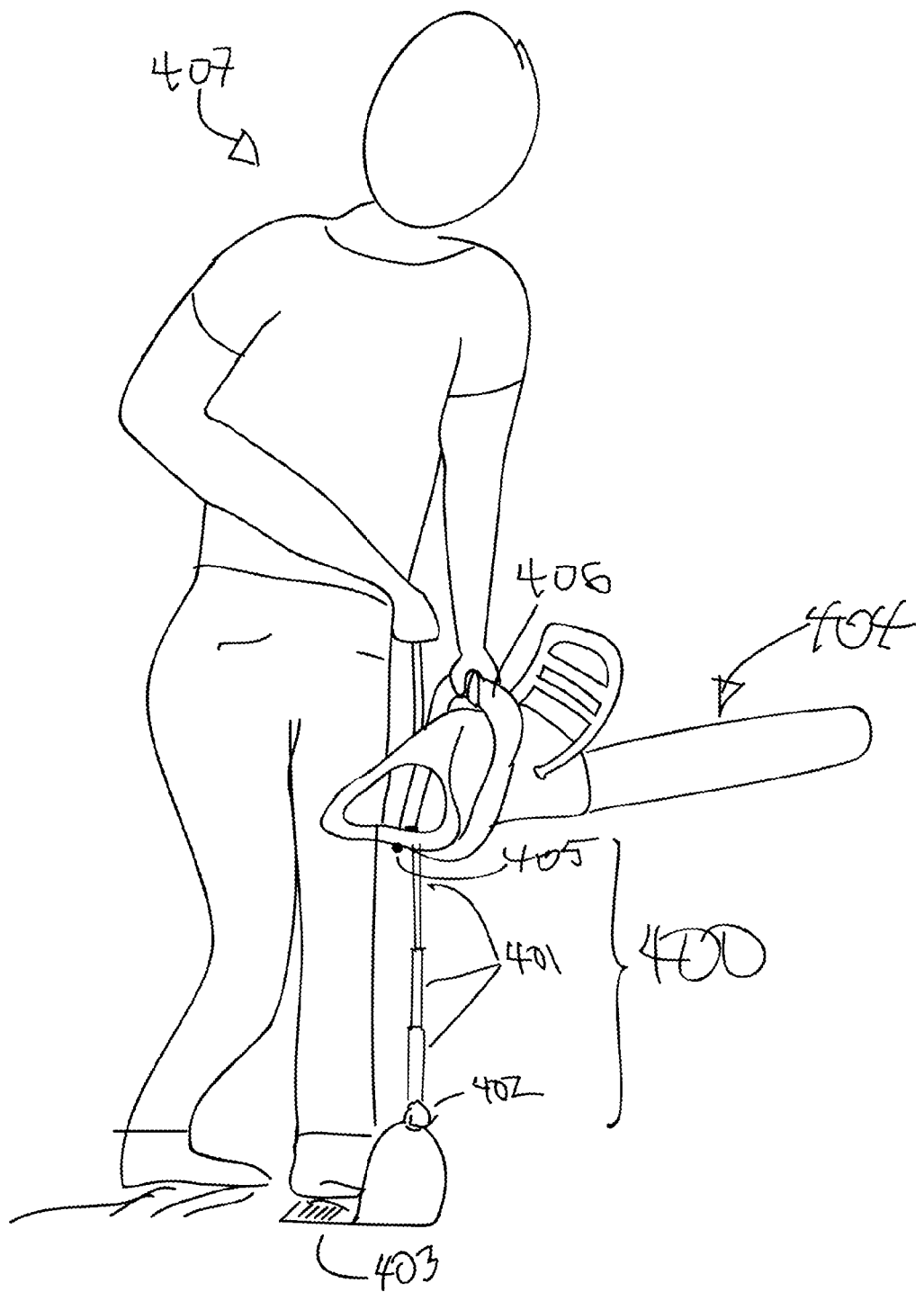
FIG. 4. Typical deployment of third embodiment of the inventive chainsaw restraint, comprising an extendable rigid tether having telescoping sections for length adjustment.

In further embodiments, an extendable rigid pole may replace the flexible tether as the elongated member tying the foot placement to the chainsaw. Referring to FIG. 4, the rigid pole tether member 400 of the invention may comprise collapsible telescoping members 401 for extending the rigid pole or collapsing it for length adjustment. Moreover, a rigid elongated member may be hingeably or rotatably attached to the foot placement member so that the angle of the elongated member with respect to the vertical or horizontal may be freely adjusted. A hinge means may be used for rotation of the vertical angle of the elongated member, giving two degrees of freedom of adjustment, including the length adjustment (cylindrical coordinate system).

A ball and socket joint means 402 as shown in FIG. 4 may be affixed at a first end to the foot placement 403 and used for a rotatable attachment adjusting the azimuthal angle as well as the vertical angle, giving three degrees of freedom of adjustment (spherical coordinate system). The rigid pole tether may be attached to chainsaw 404 by a variety of attachment means, such as hook 405 attached to the bottom portion of front handle 406 as described above for the preferred embodiments. However, the attachment means is not limited to hook 405, and may also comprise a securable strap, or clamping means affixed to the rigid pole tether member 400 by at its second end. Said attachment means may be secured to chainsaw 404 in a manner similar to those described above to secure the tether to chainsaw 404. The use of the invention by operator 407 is then performed in the same manner as that described above.

In yet a further embodiment, a metal chain may replace the flexible tether as the elongated member tying the foot placement to the chainsaw.

In a still further embodiment, a stretchable rubber cord may replace the flexible tether as the elongated member tying the foot placement to the chainsaw.

In yet a still further embodiment, a rope cord may replace the flexible tether as the elongated member tying the foot placement to the chainsaw.

In yet a still further embodiment, a braided wire cable or rope may replace the flexible tether as the elongated member tying the foot placement to the chainsaw.

Example of Method of Use of the Invention

The following example demonstrates a preferred method of use of the invention. A gasoline-powered chainsaw is used in this example to represent gasoline-powered handheld sawing tools having an on-board gasoline engine, however this example is by no means restricted to gasoline-powered chainsaws, and can be applied to other tools in this category of tool. An operator of a gasoline-powered chainsaw may first place the foot engagement member on a solid surface. Preferably, the solid surface comprises a portion substantially even ground. However, the solid surface may include a tree stump, a boulder, or other suitable and convenient surface. The operator may then step one foot into the foot engagement member, which preferably comprises a stirrup or footplate, and presses the foot engagement member firmly to the ground using his or her full body weight or a portion thereof. Preferably, the operator then grips the top portion or segment of the chainsaw's front handle with one hand, the gripping arm that is attached to the gripping hand extended substantially downward so that the chainsaw may be may then be held below hip-level while the operator stands in a substantially upright position, holding his or her lower back substantially upright, but may hunch over the shoulders somewhat such that the operator is poised to crank the on-board engine. The operator may then attach the tether attachment means, such as the hook disclosed above in the preferred embodiment, to the front handle of a chainsaw by hooking the hook on the front handle, typically on the bottom portion or segment of the handle on the left side of the chainsaw. The operator may then adjust the length of the tether, which for this example may be a flexible fabric strap, using the cinch buckle by which the operator pulls the end of the strap through the buckle slot. The tether is then adjusted to a suitable length such that the anchored tether is taught when the operator holds the chainsaw at a comfortable and safe height with respect to the anchoring foot, generally accepted that the foot is at ground level. Preferably, the height of the chainsaw is chosen such that the tether member is substantially collinear with the operator's fully extended gripping arm pointed downward when the attached and anchored tether is pulled taught. The operator may then hold the tethered chainsaw at a comfortable and safe height for cranking the on-board engine, preferably between the waist and the knee while the gripping arm is substantially fully extended. If the operator is right-handed, the operator would tend to use his or her right hand to start the on-board engine by pulling on the recoil starter rope to crank the engine.

The operator then firmly and securely grips the top of the front handle of the chainsaw with his or her gripping hand while using the opposite hand to crank the on-board engine, all the while gripping the chainsaw firmly with the gripping hand and pointing the chainsaw away from the body. Once the engine starts, the invention constrains the chainsaw from moving vertically towards the operator's upper body in an uncontrolled manner, avoiding kickback that commonly can occur when starting a chainsaw, and therefore avoiding any serious injury to the operator therefrom. Once the on-board engine is started and running, the operator may then disengage the tether attachment means from the chainsaw, disengage his or her foot from the foot placement, and proceed to use the chainsaw.

While the embodiments disclosed above describe the invention in its various manifestations, the foregoing embodiments are to be understood by persons skilled in the art as exemplary in nature, and are in no way intended to be construed as the only embodiments possible for the invention. Those skilled in the art will also understand that other embodiments and examples of deployment of the inventive chainsaw restraint tether are conceivable and possible without departing from the scope and spirit of the invention, as claimed below.

What is claimed is:

1. A lightweight and compact motion restraint tether for safely starting a gasoline-powered chainsaw having an onboard engine in combination with the gasoline-powered chainsaw, comprising:
   (i) a-foot engagement member comprising a foothold base structure and an aperture, said aperture having a perimeter, said perimeter having an upper portion and a lower portion, wherein the upper-portion of the perimeter comprises an arch-shaped frame, and the lower portion of said aperture perimeter comprises at least a part of the foothold base structure, whereby the operator of said gasoline-powered chainsaw extends at least one foot through said aperture so that the bottom of the chainsaw operator's at least one foot presses against said foothold base structure to hold the foot engagement member securely against a solid surface using at least a portion of the body weight of the chainsaw operator, said foot engagement member further adapted to be lightweight and compact for facile portability by said operator; and
   (ii) an elongated tether member adapted to restrain the upward motion of said gasoline-powered chainsaw when said onboard engine is started by an operator of said gasoline-powered chainsaw, said tether member having a first end and a second end, wherein the first end of the elongated tether member is attached to the foot engagement member, and the second end is affixed to the gasoline-powered chainsaw, said elongated tether member further adapted to be lightweight and compact for facile portability by said operator;
   wherein the foothold structure of the foot engagement member comprises a substantially flat pedal portion comprising a plurality of sides, ends of the arch-shaped frame being affixed to two of the plurality of sides of the substantially flat pedal portion, forming a stirrup having an enclosed aperture configured to accommodate at least one foot of the operator extended through it, and wherein the stirrup further comprises a pocket structure, the pocket structure integral with the pedal portion of the foothold structure of the foot engagement member, whereby when the operator inserts a front portion of at least one foot therein, the pocket at least partially covers the operator's at least one foot.

2. The motion restraint tether of claim 1, wherein the elongated tether member has an adjustable length.

3. The motion restraint tether of claim 1, wherein the elongated tether member comprises two independent segments, each segment having two ends and attached together by an attachment means to form a single tether, the attachment means having two mating members, each of the two mating members being disposed on one end of each of the two tether segments.

4. The motion restraint tether of claim 3, wherein the attachment means is a quick-release buckle.

5. The motion restraint tether of claim 1, wherein the foothold structure of the foot-engagement member is a substantially flat plate section.

6. The lightweight and compact chainsaw motion restraint tether of claim 1, wherein the foothold structure of the foot engagement member comprises a substantially rod-shaped portion having two ends, the ends of the arch-shaped frame being affixed to the two ends the rod-shaped portion, forming a stirrup having an enclosed aperture through which at least one foot of the operator is extended.

7. A lightweight and compact motion restraint tether for safely starting a gasoline-powered chainsaw having an onboard engine in combination with the gasoline-powered chainsaw, comprising:
   (i) a-foot engagement member comprising a foothold structure, an arch-shaped structure comprising an apex and two ends, the two ends of said arch-shaped structure being affixed to the foothold structure in such a way that an enclosed aperture is formed, whereby an operator of said chainsaw extends at least one foot through said aperture in such a way that the bottom of said at least one foot presses against the foothold structure to hold the foot engagement member securely against a solid surface using at least a portion of the body weight of the operator; and
   (ii) an elongated tether member adapted to restrain the upward motion of said gasoline-powered chainsaw when said onboard engine is started by an operator of said gasoline-powered chainsaw, said tether member having a first end and a second end, wherein the first end of the elongated tether member is attached to the foot engagement member, and the second end is affixed to the gasoline-powered chainsaw, said elongated tether member further adapted to be lightweight and compact for facile portability by said operator;
   wherein the foot engagement member is a stirrup comprising an arch-shaped bracket forming the upper portion of the aperture perimeter, and wherein the foothold structure comprises a substantially flat pedal portion with a plurality of sides, the arch-shaped bracket having two ends, the two ends being affixed to two of the plurality of sides of the pedal portion so as to from an enclosed aperture, wherein the foothold structure further comprises a pocket integral with the pedal portion of the foothold structure, whereby when the operator inserts a front portion of at least one foot therein, the pocket at least partially covers the operator's at least one foot.

8. The lightweight and compact chainsaw motion restraint tether of claim 7, wherein the foot engagement member is a stirrup comprising an arch-shaped bracket forming the upper portion of the aperture perimeter, and wherein the foothold structure is a rod having two ends, the arch-shaped bracket having two ends, the two ends being affixed to the ends the rod so as to form an enclosed aperture.

9. The motion restraint tether of claim 7, wherein the elongated tether member has an adjustable length.

10. The motion restraint tether of claim 7, wherein the elongated tether member comprises two independent tether segments, each having two ends, and attached together by an attachment means to form a single tether, the attachment means having two mating members, each of the two mating members being disposed on one end of each of the two tether segments.

11. A lightweight and compact motion restraint tether for safely starting a gasoline-powered chainsaw having an on-board engine in combination with the gasoline-powered chainsaw, comprising:
   (i) a-foot engagement member comprising a stirrup having an arch-shaped frame comprising an apex and two ends and forming the upper portion of the stirrup, the two ends of said arch-shaped structure being affixed to a foothold structure wherein the foothold structure forms the bottom portion of the stirrup, whereby an operator of said chainsaw extends at least one foot through said stirrup in such a way that the bottom of said at least one foot presses against the foothold structure to hold the foot engagement member securely against a solid surface using at least a portion of the body weight of the operator such that the tether member is securely anchored to the solid surface, said foot engagement member further adapted to be lightweight and compact for facile portability by said operator; and (ii) an elongated tether member adapted to restrain the upward motion of said gasoline-powered chainsaw when said onboard engine is started by an operator of said gasoline-powered chainsaw, said tether member having a first end and a second end, wherein the first end of the elongated tether member is attached to the foot engagement member, and the second end is affixed to the gasoline-powered chainsaw, said elongated tether member further adapted to be lightweight and compact for facile portability by said operator, and wherein the foot engagement member is adapted to anchor the attached elongated tether member securely to a solid surface;

wherein the foothold structure of the stirrup comprises a substantially flat pedal bottom portion that is integrally fixed to the upper arch-shaped frame, and wherein the stirrup further comprises a pocket structure, whereby the pocket structure is integral with the substantially flat bottom portion of the foothold structure and is configured to at least partially cover a front of the operator's foot.

12. The lightweight and compact chainsaw motion restraint tether of claim 11, wherein the foothold structure of the stirrup is a substantially rod-shaped bottom portion that is integrally affixed to the upper arch-shaped frame.

13. The motion restraint tether of claim 11, wherein the elongated tether member has an adjustable length.

14. The motion restraint tether of claim 11, wherein the elongated tether member comprises two independent tether segments, each having two ends, and attached together by an attachment means to form a single tether, the attachment means having two mating members, each of the two mating members being disposed on one end of each of the two tether segments.

15. The motion restraint tether of claim 14, wherein the attachment means is a quick-release buckle.

* * * * *